(12) United States Patent
Goda et al.

(10) Patent No.: US 6,605,388 B1
(45) Date of Patent: Aug. 12, 2003

(54) BATTERY CELL ELECTRODE CORE PLATE, FABRICATION METHOD THEREFOR, AND BATTERY CELL MADE THEREWITH

(75) Inventors: Yoshio Goda, Yao (JP); Mamoru Iida, Kadoma (JP); Takeo Takayanagi, Nara (JP); Masahiko Ogawa, Takarazuka (JP); Yoshio Moriwaki, Hirakata (JP); Saburo Nakatsuka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 167 days.

(21) Appl. No.: 09/705,057

(22) Filed: Nov. 2, 2000

Related U.S. Application Data

(62) Division of application No. 09/195,476, filed on Nov. 18, 1998, now abandoned.

(30) Foreign Application Priority Data

Dec. 25, 1997 (JP) .............................. 9-357805

(51) Int. Cl.$^7$ ................................. H01M 4/32
(52) U.S. Cl. ...................... 429/223; 429/233; 429/239; 429/243; 29/2
(58) Field of Search ................. 429/233, 239, 429/243; 29/2

(56) References Cited

U.S. PATENT DOCUMENTS 5,162,178 A * 11/1992 Ohsawa et al. ............. 429/213

FOREIGN PATENT DOCUMENTS

| EP | 651451 | * 11/1994 | ............ H01M/4/70 |
| JP | 11-185763 | * 7/1999 | ............ H01M/4/70 |

* cited by examiner

Primary Examiner—Carol Chaney
Assistant Examiner—Dah-Wei Yuan
(74) Attorney, Agent, or Firm—Jordan & Hamburg LLP

(57) ABSTRACT

In a first process, an electrically conductive thin metal plate 7 is subjected to a press molding process employing a plurality of punches 3 in a primary molding block 1 and a plurality of dies 4 in a secondary molding block 2, so as to form therein a plurality of hollow projections 9 that project from one side of the metal plate 7, and bulges 14 that bulge out in a direction opposite to that of the projections 9, positioned between the projections 9. In a second process, the metal plate 7 on which have been formed the plurality of projections 9 and bulges 14 is subjected to either chemical etching or electrolytic etching, so as to form through holes 17 by corrosively removing thin-walled portions 11 from the tips of the projections 9, and, at the same time, to corrosively form innumerable fine irregularities 18 over the entire surface of the metal plate 7.

15 Claims, 7 Drawing Sheets

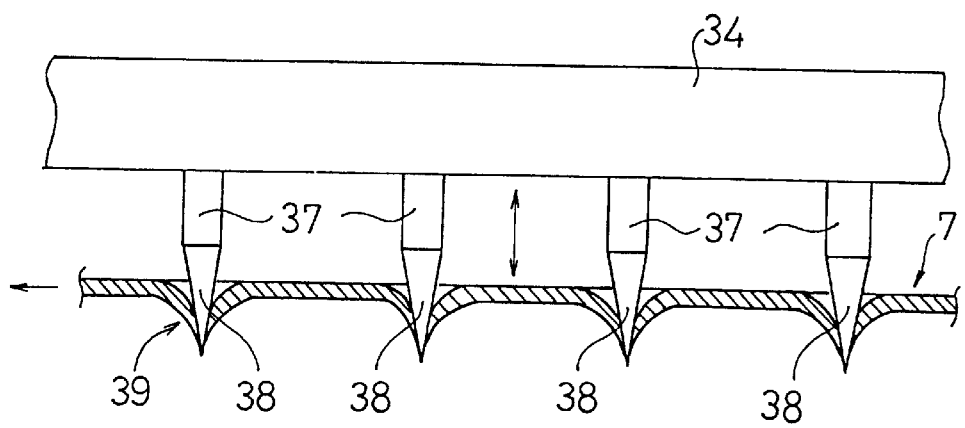
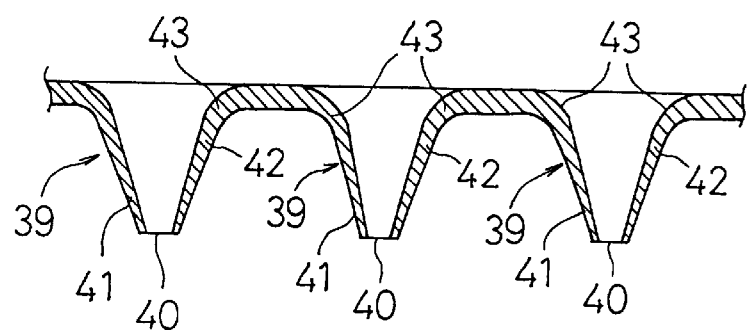
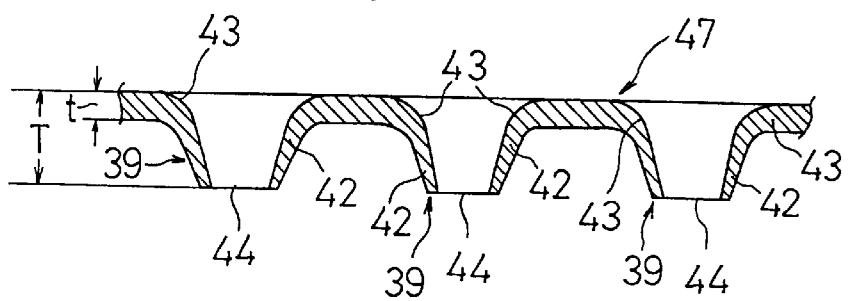

BATTERY CELL ELECTRODE CORE PLATE, FABRICATION METHOD THEREFOR, AND BATTERY CELL MADE THEREWITH

This is a divisional, of application Ser. No. 09/195,476, filed Nov. 18, 1998 now abandoned.

BACKGROUND OF THE INVENTION

1. Technical Field of the Invention

This invention relates to electrode core plates that constitute materials used in configuring the positive and negative electrode plates that are used in various types of primary cell, and in the various types of secondary cell of which the main representative types are polymer electrolyte secondary cells, non-aqueous lithium secondary cells, and alkaline secondary cells, together with a method of fabricating such core plates, and cells wherein such core plates are employed.

2. Description of Related Art

Most of the primary cells used in portable equipment are either manganese dry cells, alkaline manganese dry cells, or lithium cells. In the field of secondary cells, nickel-cadmium storage cells and nickel-hydrogen storage cells have been in wide use for some time. In more recent years, lithium ion secondary cells using organic electrolytes, lithium secondary cells using polymer electrolytes, and lithium secondary cells using solid electrolytes, all of which feature lighter weight, have begun to be used.

It is now being demanded in these cells, in recent years, that they perform in a way that exhibits higher energy density, and the appearance of cells exhibiting higher volume-energy density (Wh/l) and weight-energy density (Wh/kg), which are indices of how compact and how light-weighted the cells are, is eagerly awaited. The main factor in determining energy density in battery cells is the active material in the positive and negative electrodes that constitute the power generating elements, but another very important problem is that of how to improve the electrode core plates that retain the active materials in the electrode plates and collect the electrical current. In other words, the energy density of the cells can be improved if the electrode core plates are made thinner and lighter in weight without impairing the current collection characteristics that bear upon electrode reaction utilization factor and the ability to retain the active material.

Typical electrode core plates that have been used conventionally are sintered substrates, porous metal foam substrates, flocculated substrates, perforated corrugated substrates, punched metal substrates, expanded metal substrates, and metal foil substrates. Among these, the first four types, namely sintered substrates, porous metal foam substrates, flocculated substrates, and perforated corrugated substrates, result, after processing, in electrodes of comparatively large thickness, i.e. 0.5 mm or greater. The last three types, namely punched metal substrates, expanded metal substrates, and metal foil substrates, on the other hand, yield, after processing, electrodes of comparatively thin thickness.

The sintered substrate is made by forming nickel or other metal powder into a substrate form and sintering it. The holes in the sintered body are filled with an active material and the substrate is used, for example, as the positive electrode in an alkaline storage cell. The advantage of this sintered substrate is that, as an electrode plate, it exhibits outstanding current collection characteristics and active material retention ability. In the porous metal foam substrate, a metal such as nickel is fashioned into a sponge-like three-dimensionally porous body. This type of substrate is currently used, for example, in the positive electrodes of high-capacity alkaline storage cells. In the flocculated substrate, the surface of a metal sheet is flocked with metal fibers. In the perforated corrugated substrates disclosed, for example, in Japanese Published Unexamined Patent Applications No.7-130370 and in No.7-335208, burrs are formed around punched holes, from one or both sides of a metal plate, which is then subjected to corrugation molding. By adopting these substrates in the coated electrodes on which an active material is coated, it is hoped that improvements will be realized in the current collection characteristics and active material retention ability of the electrodes.

The punched metal substrate is fabricated by subjecting a metal plate to a perforating process using a metal die punch. The expanded metal substrate is obtained by subjecting a metal plate to lath processing. Since both of these substrates are comparatively inexpensive, they are widely used as electrode core materials. The metal foil substrate is used in applications where aluminum, copper, or other metal foil is used as the electrode core plates, and is widely used in thin electrode plates in lithium secondary cells, etc., due to its characteristic of being thin.

What is demanded in these electrode core plates, in addition to low cost and being very amenable to mass production, is that they perform well as electrode plates. More specifically, it is demanded that they exhibit excellent current collection characteristics, excellent active material retention, the absence of sharply pointed projections or burrs that cause separator rupture, resulting in internal shorts between positive and negative electrodes, small volume in the interest of higher energy density, and the ability of the electrolyte or gasses to circulate properly, etc. Among the electrode core plates discussed in the foregoing, however, not a single one satisfies all of these demands in a balanced manner.

More specifically, the sintered substrate exhibits a high base material volume ratio, making it unsuitable for achieving high energy density in electrode plates, and it is also expensive. Both the porous metal foam substrate and the flocculated substrate are comparatively expensive, and each suffers the shortcoming of being susceptible to internal shorting caused by metallic projections. The perforated corrugated substrate retains the active material by projections and burrs, for which reason bonding with the active material is relatively weak, and further suffers the shortcoming of a susceptibility to internal shorting caused by the burrs around the holes. Both the punched metal substrate and the expanded metal substrate have a flat and comparatively simple shape, and therefore are inferior in terms of current collection characteristics and active material retention ability. The metal foil substrate basically has no holes in it, making it problematic in terms of electrolyte liquid circulation and of the current collection characteristics and active material retention exhibited by the electrode plate.

SUMMARY OF THE INVENTION

In view of the foregoing, an object of the present invention is to provide electrode core plates that exhibit high active material retention capabilities and good current collection characteristics, with which high energy density can be achieved, and wherewith there is no danger of internal shorting, while also providing a fabrication method therefore and battery cells wherein such electrode core plates are used.

In order to achieve the object stated above, the present invention is a method of fabricating a battery cell electrode core plate that retains an active material and performs a current collection action, comprising: a first process of fabricating, by press molding, a thin metal plate exhibiting electrical conductivity, by means of a plurality of conical or pyramidal punches arranged in a primary molding block and of a plurality of concave dies corresponding to the punches and arranged in a secondary molding block, thereby forming in the metal plate, a plurality of hollow projections that project from one side thereof, and bulges that bulge out in the opposite direction from the projections in the intervals between the projections; and a second process of forming, by subjecting the metal plate whereon are formed the plurality of projections and the bulges to either chemical etching or electrolytic etching, a plurality of through holes by corrosively removing the thin-walled material at the tips of the projections, and forming, at the same time, by corrosion, innumerable minute irregularities over the entire surface of the metal plate.

When this method of fabricating electrode core plates is employed, the simple process of etching is adopted as the second process, wherefore, in the first process, if one merely forms hollow shaped projections wherein the material at the tips is of necessity thinned out, these thin-walled portions will be removed corrosively in the second process and through holes will definitely be formed. When, as in the prior art, a thin metal plate is perforated by a hole punching tool, it is very difficult to punch the holes in a high-density arrangement, the opening ratio rises no higher than 20% or so, and burrs tend to develop. When the method of fabricating electrode core plates according to the present invention is employed, however, the perforations are formed with a high opening ratio of 60%, and can be formed in a high-density arrangement, while, in addition, the corrosion induced by the etching solution does not produce burrs or other sharply pointed places. This method therefore makes it possible to fabricate high-quality electrode core plates, wherewith there is no danger of internal shorting, in a process that is extremely inexpensive and well suited to mass production.

Another method of fabricating a battery cell electrode core plate according to the present invention comprises: a first process of fabricating, by press molding, a thin metal plate exhibiting electrical conductivity, by means of a plurality of conical or pyramidal primary punches and a plurality of concave primary dies arranged alternately in a primary molding block, and of a plurality of concave secondary dies corresponding to the primary punches and conical or pyramidal secondary punches corresponding to the primary dies arranged in a secondary molding block, thereby forming, in the metal plate, a plurality of hollow projections that alternately project from both sides thereof, and bulges that bulge out in the opposite direction from the projections in the intervals between the projections: and a second process of forming, by subjecting the metal plate whereon are formed the plurality of projections and bulges to either chemical etching or electrolytic etching, a plurality of through holes by corrosively removing the thin-walled material at the tips of the projections, and forming, at the same time, by corrosion, innumerable minute irregularities in the entire surface of the metal plate. Thereby, in addition to realizing the same benefits as with the fabrication method described earlier, a battery cell electrode core plate can be fabricated wherein the projections project alternately from both sides.

In the first process in the present invention, as described above, it is possible to form the projections and the bulges with a reciprocal motion, using a setup wherein the primary molding block and the secondary molding block are positioned in parallel. Alternatively, a metal plate that is being moved at a constant speed can be fed in between the primary and secondary molding blocks that are linked together in a roller press configuration, so that a plurality of hollow projections together with a plurality of bulges that bulge out in the opposite direction from the projections are continuously formed in the metal plate. Thus it is possible to mass produce electrode core plate of high quality.

In the present invention as described above, moreover, after the second process has been finished, the metal plate wherein the plurality of projections and bulges are formed can be subjected to press processing from both sides so that some of the bulges are made flat. By so doing, the volume of the electrode core plate can be reduced and high energy density is achieved.

In the battery cell electrode core plate manufactured by the fabrication method of the present invention, projections that project on one side are formed, through holes opened in the thickness dimension of the metal plate are formed inside the projections, bulges that bulge out in the opposite direction as the projections are formed between the projections, and many minute irregularities distributed over the entire surface of the metal plate are formed.

In this electrode core plate, contact with the active material is improved by the presence of the bulges, as compared to where the plate is flat. In addition, due to the numerous minute irregularities, the degree of bonding between the active material and the electrode core plate is improved and, at the same time, the electrolyte liquid retention is improved. Furthermore, the active material particles on both sides of the electrode core plate are directly interconnected via the through holes so that the active material bonding strength is improved while, at the same time, the circulation of the electrolyte and gas is facilitated by the through holes. Accordingly, in electrode plates wherein this electrode core plate is used, both the current collection characteristics and active material retention are excellent. In addition, because the plate is formed by an etching process, burrs and other sharp places are the first places to be dissolved, so that they disappear, for which reason the occurrence of internal shorts is suppressed.

In battery cell electrode core plate manufactured by another fabrication method according to the present invention, in the electrically conductive metal plate, projections are provided that project alternately on both sides, through holes are opened in the thickness dimension of the metal plate inside the projections, bulges that bulge out in the opposite direction from the projections are provided in the trunks of the projections, and numerous minute irregularities are provided, distributed over the entire surface of the metal plate. In addition to the benefits of the electrode core plate noted earlier, this electrode core plate is advantageous in that the active material retention capability is further improved because the projections are present on both sides of the metal plate.

In the electrode core plate described in the foregoing, it is preferable that the plurality of through holes are configured in a regular distribution, arranged in a two-dimensional lattice form. When that is done, active material retention is uniform all over the metal plate and high current collection characteristics are obtained.

It is also desirable that the hole shapes in the through holes be either circular or polygonal.

It is further desirable that the thickness of the battery cell electrode core plate (that is, the apparent thickness that includes the projections either on one side or on both sides of the metal plate) be set at a thickness that is no more than three times the original thickness of the metal plate. When that thickness exceeds three times the original thickness, the condition of contact with the active material is favorable, but the tensile strength is inadequate when processing the electrode plate, resulting in electrode plate breaks and this also readily becomes a cause of internal shorting. If the thickness of the battery cell electrode core plate is expressed as X $\mu$m and the opening ratio as Y%, then the configuration should be such that $20 \leq X \leq 50$ and $Y \leq X+10$.

The electrically conductive material making up the metal plate should preferably be any of iron, copper, nickel, aluminum, or some alloy made up primarily of these metals. It is also desirable that the amounts of the impurity elements silicon and carbon contained in the conductive materials making up the metal plate be limited to 0.2 wt % or less, respectively, in order to prevent a deterioration in the active material utilization factor.

It is moreover desirable that at least some part of the electrically conductive materials making up the metal plate be integrated with another substance that is either a metallic material, an inorganic substance, or an organic substance. This will prevent corrosion being caused by the electrolyte and enhance durability.

The battery cell of the present invention is configured by forming an electrode plate by packing in the active material from both sides of the battery cell electrode core plate of the present invention, and making this electrode plate at least either the positive or the negative electrode. This battery cell will exhibit high current collection characteristics, not be susceptible to internal shorting, and facilitate the attainment of high energy density.

BRIEF DESCRIPTION OF THE DRAWINGS

FIG. 8A is a vertical cross-sectional view of a processing apparatus for implementing a first process in a method of fabricating an electrode core plate in a third embodiment of the present invention; FIG. 8B is a vertical cross-sectional view of the metal plate after the first process; and FIG. 8C is a vertical cross-sectional view of the electrode core plate formed in the course of a second process;

DETAILED DESCRIPTION OF PREFERRED EMBODIMENTS

Preferred embodiments of the present invention are now described in detail with reference to the accompanying drawings.

Figure 1:
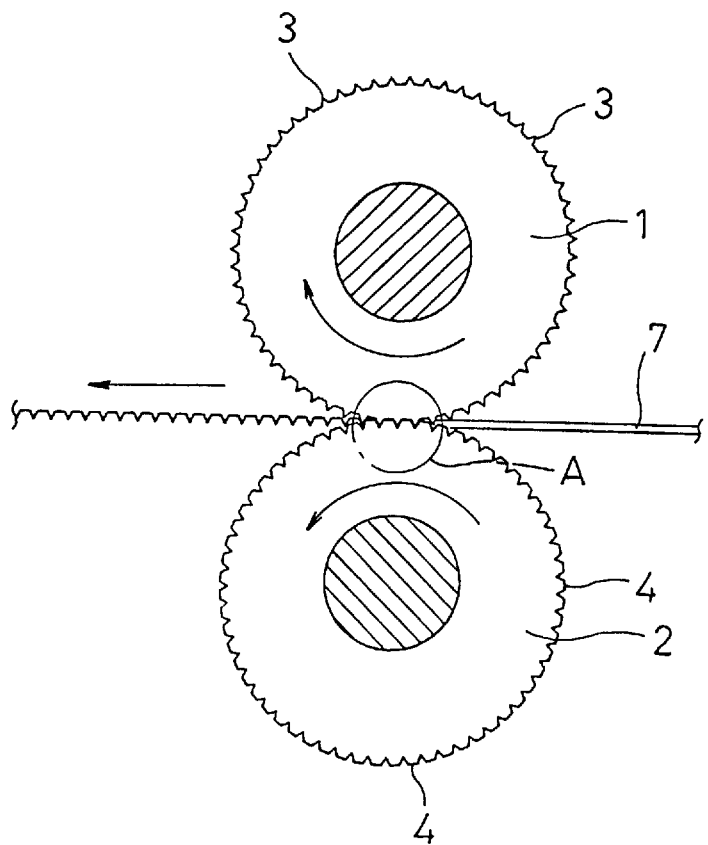
FIG. 1 is a front elevation of a processing apparatus for implementing a first process in a method of fabricating an electrode core plate in a first embodiment of the present invention.
Figure 2:
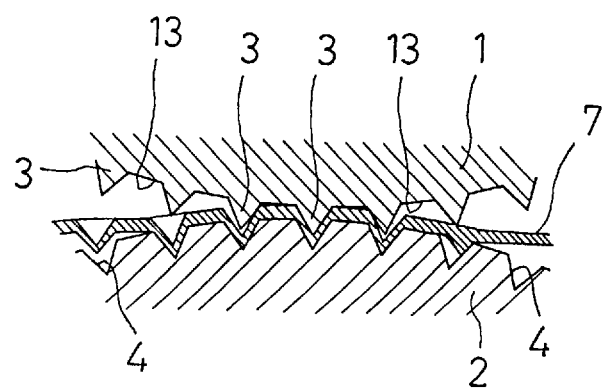
FIG. 2 is an enlarged cross-sectional view of area A in FIG. 1.

FIG. 1 is a front elevation of a processing apparatus for implementing a first process in a method of fabricating an electrode core plate in a first embodiment of the present invention, while FIG. 2 is an enlarged cross-sectional view of area A in FIG. 1. This embodiment exemplifies a case where electrode core plate is manufactured continuously in a rotary press setup, using a primary molding block 1 and a secondary molding block 2, both of which are configured as roulette rollers. In the circumferential surface of the primary molding block 1 are formed square pyramidal punches 3 arranged in a prescribed lattice pattern. In the circumferential surface of the secondary molding block 2 are formed numerous dies 4 that accommodate the entrance of the punches 3, arranged correspondingly with reference to the punches 3. For the metal plate 7 that constitutes the base material for the electrode core plate, a sheet-form thin metal plate such as a metal foil is used, such as thin metallic aluminum plate having a thickness of 25 $\mu$, for example. This metal plate 7 base material will be described in greater detail later. The metal plate 7 is fed in between the primary molding block 1 and the secondary molding block 2 that turn in the direction of the arrow in FIG. 1, and are thus subjected to a press molding process that is similar to a deep drawing process, as diagrammed in FIG. 2. This press molding process is now described with reference to FIGS. 3A–3C.

Figure 3A:
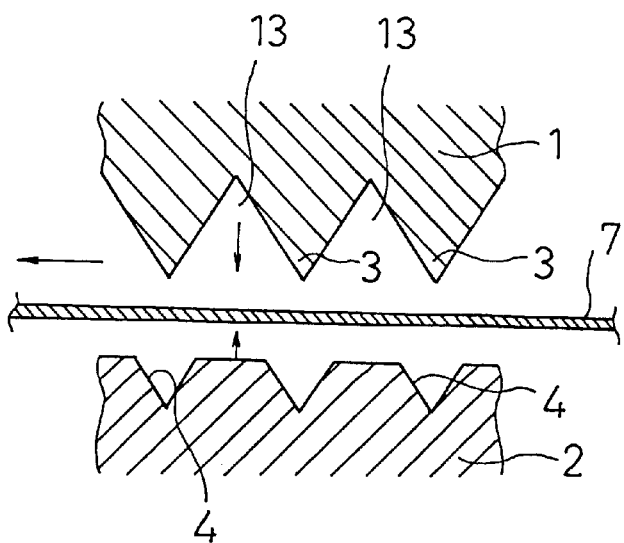
FIG. 3, in 3A to 3C, represents the order of the press molding process with the apparatus noted above, FIG. 3A being a cross-sectional view of the condition immediately prior to the metal plate being fed into the place where the two molding blocks engage, FIG. 3B being a cross-sectional view of the condition wherein the metal plate has begun to be fed in between the two molding blocks, and FIG. 3C being a cross-sectional view of the condition wherein the punches and dies are in the closest proximity in the two molding dies.
Figure 3B:
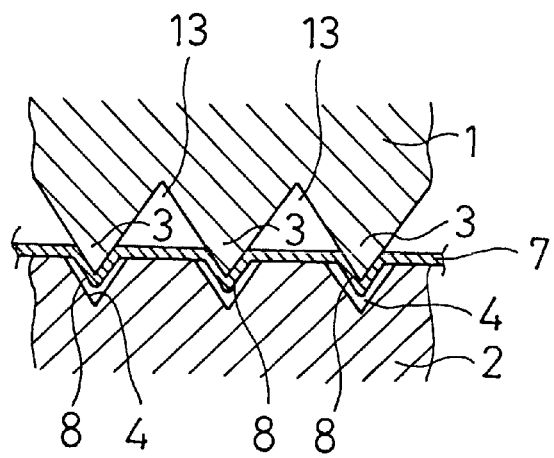
Figure 3C:
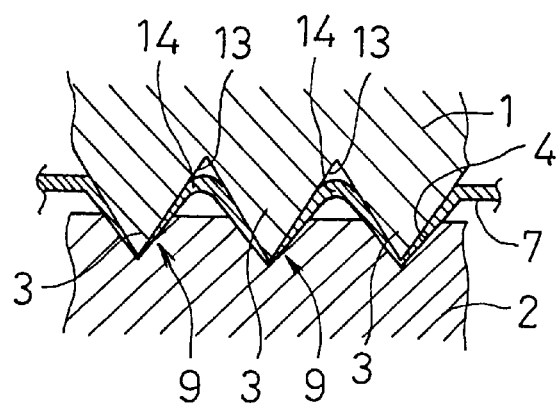

FIGS. 3A–3C are process diagrams depicting the rotary press as deployed horizontally. FIG. 3A diagrams the condition immediately prior to the feeding in of the metal plate 7 where the two molding blocks 1 and 2 engage. FIG. 3B diagrams the condition where the metal plate 7 has begun to be fed in between the engaging segments of the two molding blocks 1 and 2. As is depicted in FIG. 3B, the metal plate 7 is pushed into and bent to conform to the dies 4 of the secondary molding block 2 by being pushed down by the punches 3 in the primary molding block 1, whereby are formed square pyramidal concavities 8 corresponding to the punches 3 and the dies 4. In this embodiment, the punches 3 and dies 4 are given a square pyramidal shape, but this may be some other shape, such as a polygonal pyramid or cone shape.

Figure 4:
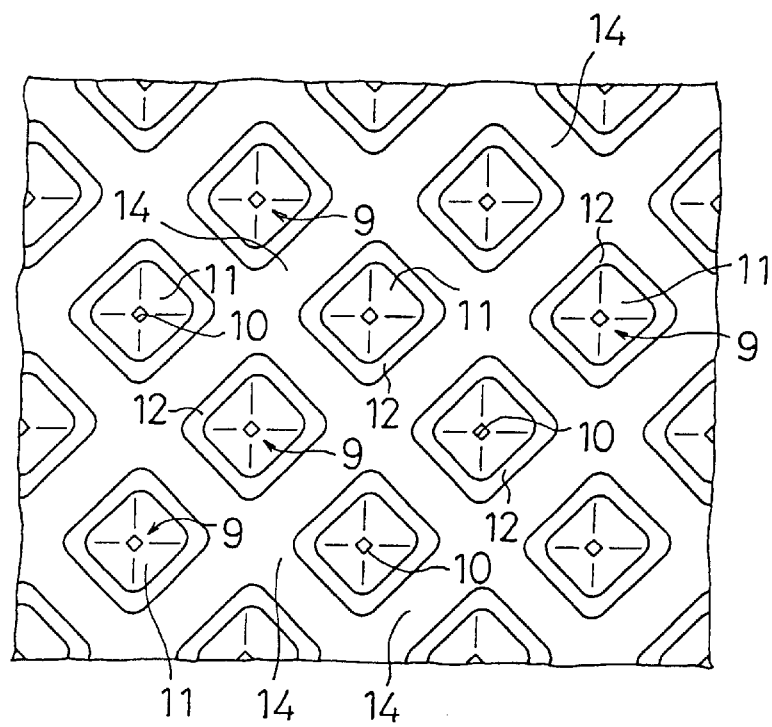
FIG. 4 is a plan view of the metal plate after the first process in the embodiment noted above.
Figure 5:
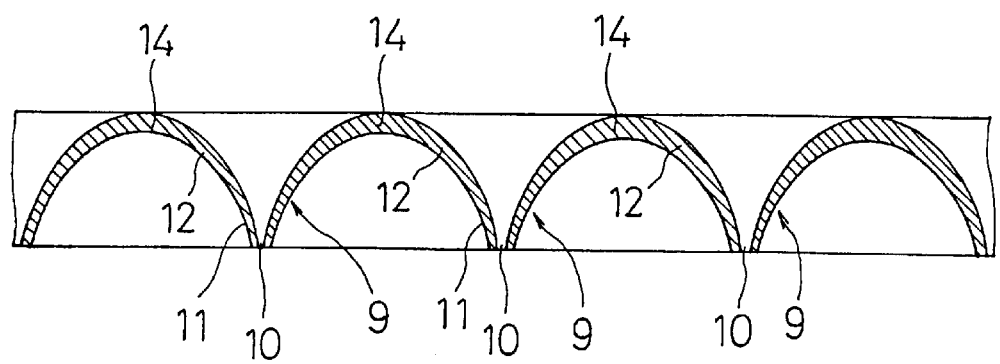
FIG. 5 is an enlarged vertical cross-sectional view of the metal plate after the first process in the embodiment noted above.

FIG. 3C diagrams a portion of the engaged state wherein the punches 3 and dies 4 in the two molding blocks 1 and 2, respectively, are in closest proximity. At this time, hollow projections 9, shaped externally as square pyramids, are formed by the numerous punches 3 and dies 4, arranged in a lattice pattern, as respectively diagrammed in the plan of FIG. 4 and the enlarged vertical cross-sectional view of FIG. 5. In the tips of the hollow projections 9, that is, in their lower ends, are generally formed very small holes 10, while thin-walled portions 11 are formed in the vicinity of the projections at their lower end, and sloping surfaces 12 are formed above and around the thin-walled portions 11. In the portions between every pair of adjacent projections 9, as diagrammed in FIG. 3C, bulges 14 that bulge out in the opposite direction as the projections 9 are formed, pushed up inside the spaces 13 between the punches 3 in the primary molding block 1 along pairs of adjacent punches 3. Many of these hollow projections 9 having the external shape of a square pyramid are arranged and evenly distributed in a two-dimensional lattice pattern corresponding to the positions of the punches 3 and dies 4 provided respectively in the primary molding block 1 and secondary molding block 2, as clearly diagrammed in FIG. 4.

Figure 6A:
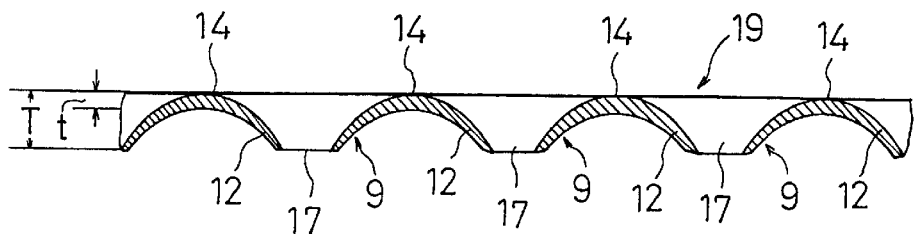
FIG. 6A is a vertical cross-sectional view of an electrode core plate molded in the course of the second process in the embodiment noted above.
Figure 6B:
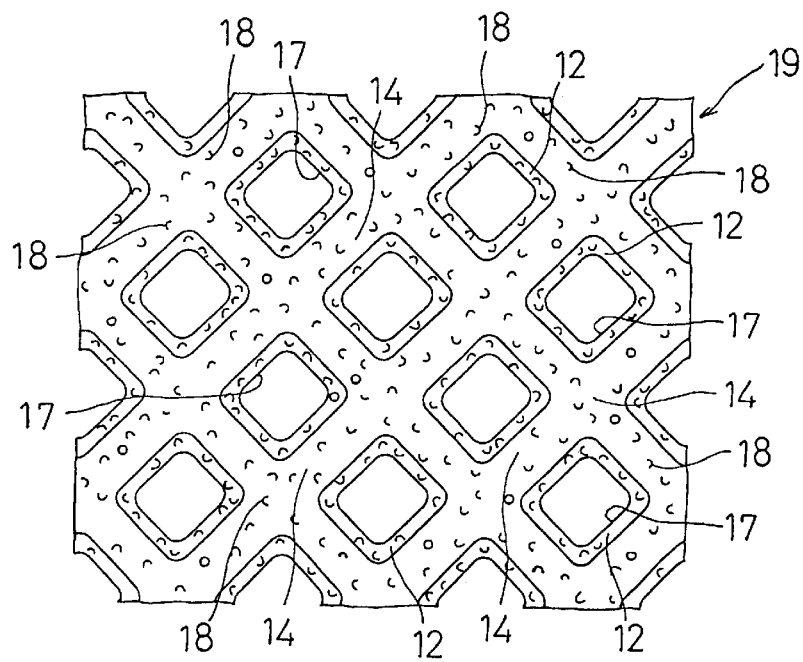
FIG. 6B is a plan view of the same electrode core plate.
Figure 6C:
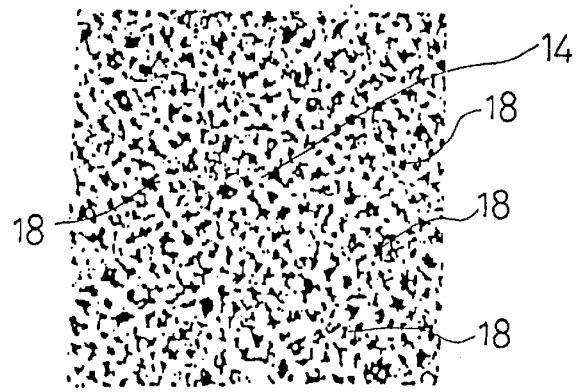
FIG. 6C is an enlarged partial view depicting the minute irregularities in the same electrode core plate.

The metal plate 7 whereon the numerous hollow projections 9 and bulges 14 are arranged as described in the foregoing is subjected to an etching treatment in a second process. This treatment corrosively removes the thin-walled portions 11 in the projections 9, as diagrammed in the vertical cross-sectional view of FIG. 6A and in the plan view of FIG. 6B. As a result, the very small holes 10 are expended to form the through holes 17, while on the bulges 14 and sloping surfaces 12 are formed numerous fine irregularities 18, by the corrosive action of the etching fluid, as diagrammed in FIG. 6C which is an enlarged diagram thereof.

In this manner the electrode core plate 19 in the first embodiment of the present invention is finished. In the etching treatment, moreover, the sloping surfaces 12 are corroded by the etching fluid so that the walls thereof are made slightly thinner, as diagrammed in FIG. 6A, while the edges of the through holes 17 that are etched take on a rounded shape, wherefore sharply pointed places are removed from the entire surface of the electrode core plate 19. It is also effective, prior to the etching treatment, to employ a method for removing the tips of the projections beforehand by some mechanical means. Alternatively, a press process may be employed from above and below, after the etching treatment, to partially flatten the bulges 14.

The etching treatment described above is performed by either chemical etching or electrolytic etching, for which the desirable etching conditions are now described. When the metal plate 7 is an aluminum thin plate as in this embodiment, a 40% aqueous solution of caustic potassium hydroxide is used as the etching fluid, into which etching fluid the metal plate 7 is immersed for 2 minutes at room temperature. When the metal plate 7 is copper thin plate, an aqueous solution of 20% ferric chloride is used as the etching fluid, immersing the metal plate 7 for 12 minutes therein. And when the metal plate 7 is steel thin plate, the etching fluid used is a mixture of 50% ferric chloride and 50% nitric acid, immersing the metal plate 7 for 10 minutes therein.

Figure 7A:
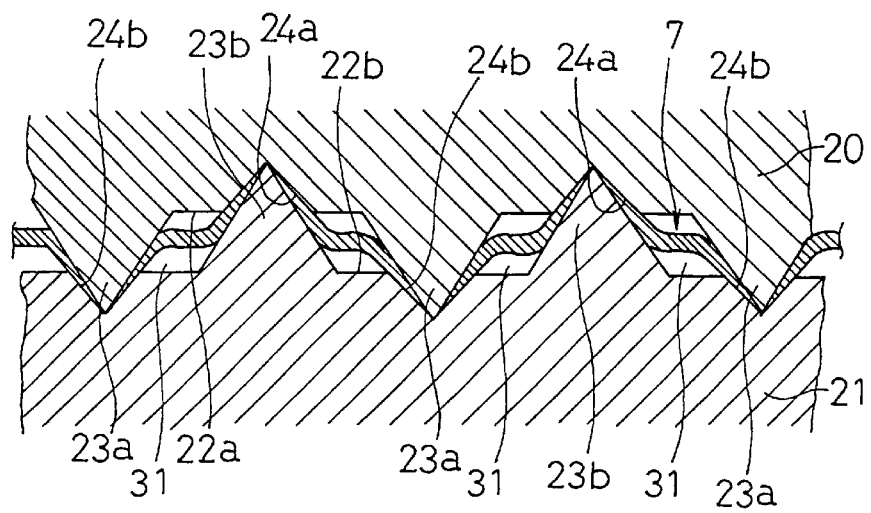
FIG. 7A is a vertical cross-sectional view of a processing apparatus for implementing a first process in a method of fabricating an electrode core plate in a second embodiment of the present invention.

FIG. 7A is a vertical cross-sectional view of a processing apparatus for implementing a first process in a method of fabricating an electrode core plate in a second embodiment of the present invention. This processing apparatus is represented in a horizontally deployed diagram of a case where the electrode core plate is continuously fabricated in a rotary press setup, using a primary molding block 20 and a secondary molding block 21 configured as roulette rollers as diagrammed in FIG. 1, similar to the embodiment diagrammed in FIG. 1. About the circumferential surface of the primary molding block 20 are formed numerous square pyramidal punches 23a that project downward from a base surface 22a, arranged in a lattice pattern, while dies 24a that are indented from the base surface 22a and have shapes corresponding to the tips of the punches 23a are formed in intermediate positions between pairs of adjacent punches 23a, respectively. The secondary molding block 21, on the other hand, is made in a shape that is a vertical inversion of the primary molding block 20. In other words, about the circumferential surface of the secondary molding block 21 are formed numerous punches 23b that project upward from a base surface 22b, shaped as square pyramids that fit into the dies 24a in the primary molding block 20, and arranged in a lattice pattern, while dies 24b that are indented from the base surface 22b and are shaped as square pyramids that can accommodate the tips of the punches 23a in the primary molding block 20 are formed in the intervals between the punches 23b.

Figure 7B:
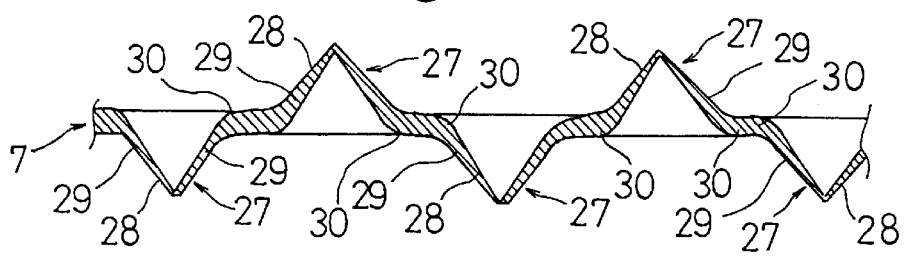
FIG. 7B is a vertical cross-sectional view of the metal plate after the first process.

The metal plate 7 is fed in between the primary molding block 20 and secondary molding block 21, subjected to a press molding process similar to a deep drawing process by the mutually corresponding punches 23a and 23b and dies 24b and 24a therein, whereby hollow projections 27 externally shaped as square pyramids are alternately formed on both sides of the metal plate 7, as diagrammed in FIG. 7B, arranged in a lattice pattern. At the tips of these hollow projections 27 are formed thin-walled portions 28, while around the thin-walled portions 28 are formed sloping surfaces 29. Furthermore, in the areas surrounding the sloping surfaces 29, the metal plate 7 is bent inside the spaces 331 between the base surfaces 22a and 22b of the upper and lower molding blocks 20 and 21, respectively, to form bulges 30. With this fabrication method, very small holes may or may not be formed in the tips of the projections 27.

The metal plate 7 wherein numerous hollow projections 27 and bulges 30 are arranged, as described above, is subjected to an etching treatment in a second process. This treatment corrosively removes the thin-walled portions 28 of the projections 27, as diagrammed in the vertical cross-sectional view in FIG. 7C, whereupon through holes 3 are formed, while, as in the first embodiment, although not shown in the drawings, numerous fine irregularities are formed by the corrosive action of the etching fluid in the bulges 30 and sloping surfaces 29. Thus the electrode core plate 32 in the second embodiment of the present invention is finished. In the etching treatment, moreover, the edges of the through holes 33 that are etched take on a rounded shape, wherefore sharply pointed places are removed from the entire surface of the electrode core plate 32.

FIG. 8A is a vertical cross-sectional view of a processing apparatus for implementing a first process in a method of fabricating an electrode core plate in a third embodiment of the present invention. With this processing apparatus is exemplified a case where, instead of the rotary press setup of the first and second embodiments, a reciprocal setup is used to fabricate the electrode core plate. In the lower surface of a press plate 34 are fixed numerous needle pins 37 having square pyramidal tips 38 in their lower ends, arranged in a lattice pattern. A press process is performed wherein, when the metal plate 7 has moved a certain length in the direction of the arrow to a prescribed position, the press plate 34 descends a prescribed distance and the tips 38 of the needle pins 37 are pushed into the metal plate 7.

After that the press plate 34 ascends and the tips 38 of the needle pins 37 are extracted from the metal plate 7, whereupon the next unprocessed portion of the metal plate 7 is moved into the prescribed position below the press plate 34 and so positioned, and the press plate 34 again descends to repeat the press process. In FIG. 8A the platform supporting the metal plate 7 is omitted.

As a result of the press molding process described above, the metal plate 7 has hollow projections 39 formed in it, externally shaped as square pyramids, and arranged in a lattice pattern, by the tips 38 of the needle pins 37, as diagrammed in FIG. 8B. Small caliber holes 40 are punched in the tips of the hollow projections 39, while thin-walled portions 41 are formed in the area surrounding the tips and sloping surfaces 42 are formed above and around the thin-walled portions 41. Radiused corners 43 are also formed above and around the sloping surfaces 42.

The metal plate 7 provided with the hollow projections 39 and the radiused corners 43, as described above, is subjected to an etching treatment in a second process. This treatment corrosively removes the thin-walled portions 41 in the projections 39, as diagrammed in the vertical cross-sectional view of FIG. 8C, whereby the small caliber holes 40 are expanded to form through holes 44, while over the entire surface thereof, although not shown in the drawings, numerous fine irregularities are formed by the corrosive action of the etching fluid, as in the first and second embodiments, whereupon the electrode core plate 47 according to the fabrication method in the third embodiment of the present invention is finished. In this electrode core plate 47 also, due to the etching treatment, the edges of the through holes 44 take on a rounded shape, whereupon all places having sharply pointed shapes are removed from the entire surface.

In the fabrication methods of the first, second, and third embodiments, described in the foregoing, an etching treatment is employed as a second process, wherefore, merely by press-molding the hollow shaped projections 9, 27, and 39 having thin-walled portions 11. 28, and 41 inevitably formed at their tips, the thin-walled portions 11, 28, and 41 are corrosively removed in the second process, thereby definitely forming through holes 17, 33, and 44. Thus, in the fabrication methods for the electrode core plate 19, 32, and 47 in the present invention, the through holes 17, 33, and 44 are formed with a high opening ratio of 60% or so, facilitating high-density arrangements, while, at the same time, burrs and other sharply pointed places are removed by the corrosive action of the etching fluid, thus making it possible to manufacture high-quality electrode core plate 19, 32, and 47 very inexpensively, with good mass production yield. By contrast, it is very difficult to punch holes in a high-density arrangement in a thin metal plate in a perforation process using a punching tool. The maximum opening ratio afforded by such a process is 20% at best, and burrs tend to be made also.

Furthermore, the electrode core plate 19, 32, 47 obtained by the fabrication methods of the present invention have in common that they all have numerous minute irregularities 18 over their entire surface, through holes 17, 33, and 44 are also provided, and there are no places having sharply pointed shapes. An electrode plate and a battery cell wherein the electrode core plate 19 based on the first embodiment is used are described below, but it should be understood that the same benefits are realized with the other electrode core plate 32 and 47.

Figure 9:
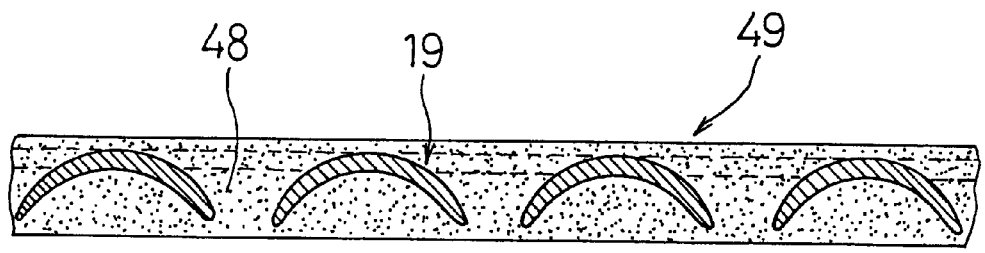
FIG. 9 is a vertical cross-sectional view of an electrode plate wherein an electrode core plate of the present invention is used.
Figure 10:
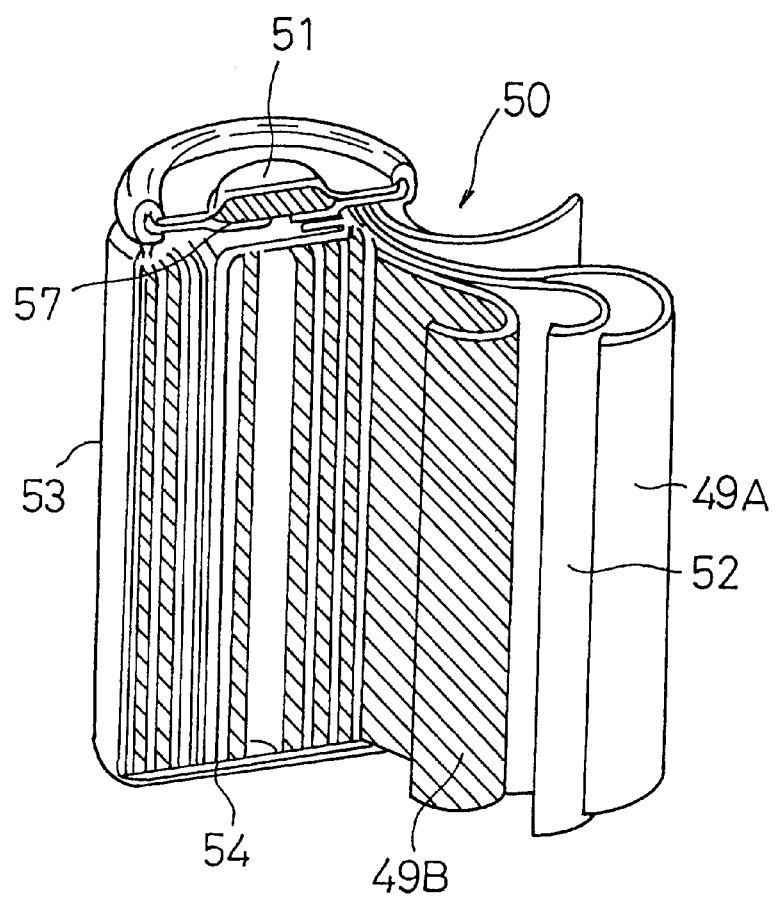
FIG. 10 is a partially cut-away diagonal view of a battery cell wherein an electrode core plate of the present invention is used.

After fabricating an electrode plate using the electrode core plate 19, actual measurements were made to evaluate battery cell performance. This is now explained further. FIG. 9 is a vertical cross-sectional view of an electrode plate 49 configured by filling in an active material 48 from both sides of the electrode core plate 19. FIG. 10 is a diagram of a battery cell 50 configured with the electrode plate 49 used in both the positive and negative electrodes. This cell 50 is now described in terms of an example wherein a lithium ion secondary cell is embodied.

The electrode core plate 19 used in this cell 50 is first described. Aluminum was used in the electrode core plate 19 for the positive electrode, as described in the first embodiment. For the electrode core plate 19 used as the negative electrode, copper foil (Cu) was used, 20 $\mu$ in thickness, with the fabrication done using the same method as in the case of aluminum in the first embodiment. For the copper, the etching treatment in the second process was done using a Solution of nitric acid. In conducting the press molding in the first process for the respective electrode core plates 19 made from copper and aluminum, respectively, when press molding the upper surface of the metal plate 7 using a primary molding block 1 having punches 3 formed as square pyramids with opening dimensions of 1.0 mm on the side and an apex angle of 60°, openings were obtained 0.3 mm or less on the side in the tips at 0.1 to 0.5 mm, yielding an opening ratio of 2% or less after the press molding. Subsequently, with the etching treatment in the second process, the opening ratio improved to 30% or so. A post-etching opening ratio of 30% or lower is desirable in the interest of the strength of the electrode core plate 19.

Using the electrode core plate 19 described above, an electrode plate 49 and battery cell 50 were fabricated. More specifically, in forming the positive electrode plate 49A, an active material 48 consisting of a paste-form mixture of a conducting agent comprising $LiCoO_2$ and acetylene black, and a fluorine resin bonding agent, was applied to an electrode core plate 19 made of aluminum, which was then dried and subjected to press pressure, and cut to prescribed dimensions. A lead (not shown) was attached to this positive electrode plate 49A to facilitate connection to a positive terminal 51 on the cell 50. For the separator 52, a finely porous polyethylene film having a thickness of 27 $\mu$ was used. In forming the negative electrode plate 49B, a paste-form active material 48 consisting of graphite beads to which a styrene butadiene rubber (SBR) bonding agent and a carboxy-methyl cellulose (CMC) thickener had been added was applied to the electrode core plate 19 made of copper, which was then dried and subjected to press pressure, and cut to prescribed dimensions.

Next the positive electrode plate 49A and negative electrode plate 49B were wound up into a spiral form, with the separator 52 interposed therebetween, accommodated in an outer metal jacket 53, and packed with an electrolyte (not shown).

Then, while connecting the positive electrode plate 49A to the positive pole terminal 51 that is a sealed battery cell cap with an aluminum lead piece (not shown), the negative electrode plate 49B was connected by a nickel lead piece (not shown) to the negative pole terminal 54 of the outer metal jacket 53. For the electrolyte that was used, lithium phosphate hexafluoride ($LiPF$) at 1 mol/l concentration was dissolved in a mixture containing ethylene carbonate (EC) and diethyl carbonate (DEC) in a molar ratio of 1:3. This electrolyte was injected into the battery cell, and, using ordinary laser sealing, the outer metal jacket 53 was sealed with a sealing plate 57 to form the sealed battery cell 50. This cell 50 has a cell weight of approximately 18 g and a cell capacity of 620 mAh. This cell 50 is herein called cell A of the present invention.

In order to make performance comparisons with the cell A of the present invention, battery cells B, C, and D were fabricated as examples of the prior art. Cell B differs from cell A of the present invention in that cell B uses a metal foil as the electrode core plate. More specifically, using aluminum foil having a thickness of 25 $\mu$ as the electrode core plate for the positive electrode, and copper foil having a thickness of 20 $\mu$ as the electrode core plate for the negative electrode, positive and negative electrode plates were configured.

Cell C differs from cell A of the present invention in that cell C uses punched metal for the electrode core plate. More specifically, using aluminum punched metal having a thickness of 30 $\mu$ and holes measuring 2 mm in diameter with an opening ratio of 20% as the electrode core plate for the positive electrode, and copper punched metal having a thickness of 25 $\mu$ and holes measuring 2 mm in diameter with an opening ratio of 20% as the electrode core plate for the negative electrode, positive and negative electrode plates were configured.

Cell D differs from cell A of the present invention in that cell D uses, for the electrode core plate, the perforated corrugated substrate set forth in Japanese Published Unexamined Patent Applications 7-130370 and No.7-335208. More specifically, using as the electrode core plate for the positive electrode an aluminum perforated corrugated substrate formed by subjecting both sides of a metal plate having a thickness of 50 $\mu$ both to a mechanical perforating process, to produce burrs, and to a corrugating molding process, and as the electrode core plate for the negative electrode a copper perforated corrugated substrate formed by subjecting both sides of a core material having a thickness of 35 $\mu$ both to a mechanical perforating process, to produce burrs, and to a corrugating molding process, positive and negative electrode plates were configured. In all respects other than the electrode core plate, the configuration of cells B, C, and D was made the same as that of cell A.

After fabricating the four types of battery cell, namely A, B, C, and D, having mutually different types of electrode core plate, as described in the foregoing, the actual performance of the electrode core plate in terms of electrode plates was subjected to comparative evaluation. First, the standard cell characteristics of the cells in their initial states were investigated. The results indicated no great difference between the four types of cell, i.e. A, B, C, and D, in terms of either charging and discharging voltages or discharge capacity.

Next, the high-efficiency discharge characteristics in a low-temperature environment were evaluated. Charging was performed in a 20° C. environment using constant voltage constant current charging (4.2 V, max. 0.5 A, 2 hours), while discharging was performed using constant current discharge at 1 CmA (620 mA) in a 0° C. low-temperature environment with an end voltage of 3.0 V. The results indicated differences between the four types of battery cell in terms of discharge voltage and discharge capacity ratio. In particular, in terms of the discharge capacity ratio relative to the standard capacity of 1 CmA at 0° C., mean values of 92% for cell A, 84% for cell B, 86% for cell C, and 87% for cell D were obtained. Thus it was clearly demonstrated that cell A of the present invention exhibits outstanding high-efficiency discharge performance at low temperatures.

Here, in terms of configuration, cell A of the present invention differs from the other three types, namely cells B, C, and D, only in the electrode core plate 19. Thus it is believed that the difference in low-temperature discharge characteristics cited above reflects a difference in the current collection characteristics of the active material 48 retained by the electrode core plate 19. Accordingly, the electrode core plate 19 of the present invention used in cell A is believed to exhibit the most outstanding current collection characteristics. This is believed to be due to the fact that the electrode core plate 19 of cell A of the present invention has bulges 14 therein, resulting in improved contact with the active material 48 as compared to a simple plate, and to the facts that the fine irregularities 18 improve active material 48 retention and electrolyte liquid retention and that the current collection characteristics are improved in conjunction with the improvement in active material 48 retention.

The charge-discharge cycle life characteristics of the four types of cell, A, B, C, and D, were also investigated. In this test, charging at constant voltage and constant current (4.2 V, max. 0.5 A, 2 hours) and discharging at constant current (0.5 CmA, end voltage 3.0 V) were repeated over and over in a 20° C. environment, and the number of cycles completed when the discharge capacity declined to 80% of the initial capacity was taken as the life of that cell. The results were that whereas cell A exhibited a life of 660 cycles, cell B exhibited a life of 480 cycles, cell C a life of 510 cycles, and cell D, except for some samples, a life of 530 cycles. Some of the cells of type D developed internal shorts at a relatively early stage.

Thus it was clearly demonstrated that cell A of the present invention exhibits outstanding performance also in terms of cycle life. This is thought to be due to the good electrolyte retention characteristics, and the significant improvement in both the adhesion and the bonding force between the active material 48 and the electrode core plate 19 afforded by the numerous fine irregularities 18 formed in the surface of the electrode core plate 19 by the etching treatment.

In another test altogether, the battery cells were subjected to vibration and shock tests. In the vibration test, the four cell types, i.e. A, B, C, and D, after the completion of the initial charge-discharge cycle, were subjected to continuous mechanical vibration by a vibration testing machine while being charged and discharged. In the shock tests, test cells were dropped a number of times from a constant height. The objective in these tests was to determine whether or not the cells were susceptible to internal shorting.

These tests were performed on the four types of cell, A, B, C, and D, using five cells of each type in each test. After the tests, cells A, B, and C exhibited no abnormality, while two of the five cell D test samples exhibited internal shorting. These results for cell D are thought to be the inevitable result of using an electrode core plate wherewith an attempt has been made to suppress active material peeling and enhance electrical conductivity with burrs having sharp edges. These tests demonstrated that cell A, in which the electrode core plate 19 is used, is a highly reliable battery cell wherewith there is little danger of internal shorting.

The four types of battery cell, A, B, C, and D, were also disassembled in dry air in order to observe the condition of the electrode plates. As a result it was found that in cell A the active material 48 was most firmly retained in the electrode core plate 19, with the active material 48 retention ability being extremely good. This is due to the enhancement in adhesive strength resulting both from the improved bonding force toward the active material 48 afforded by the presence of the bulges 14 and fine irregularities 18 and from the fact of the particles of the active material 48 on both the front and back surfaces of the electrode core plate 19 being directly connected through the through holes 17. In contrast therewith, the electrodes in cell B wherein metal foil was used for the electrode core plate, and particularly the copper foils serving as the negative electrode plates therein, were found to be exposed over their entire surfaces, and the greatest deterioration in active material retention was found therein.

Figure 7C:
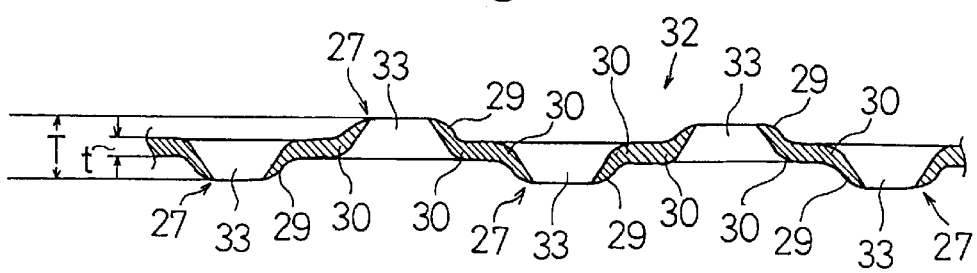
FIG. 7C is a vertical cross-sectional view of the electrode core plate formed in the course of a second process.

In order to ensure that the benefits described above are realized in battery cell A, it is desirable that the apparent thickness of the electrode core plate 19 and 47, inclusive of the projections 9 and 39, respectively, on one side thereof, that is, the thickness T of the electrode core plate 19 and 47 be no greater than three times the thickness t of the original metal plate 7, as diagrammed in FIG. 6 and FIG. 8C, and it is also desirable that the apparent thickness of the electrode core plate 32, inclusive of the projections 27 on both sides thereof, that is, the thickness T of the electrode core plate 32, be no greater than three times the thickness t of the original metal plate 7, as diagrammed in FIG. 7C. When the apparent thickness T is made greater than this three times, although desirable in terms of how well contact is made with the active material 48, the tensile strength during the press molding process is inadequate, leading to breaks in the finished electrode core plate 19, 32, and 47, and tending to cause internal shorting. Accordingly, this value should be set at 3 times or less.

In the embodiments described, aluminum and copper are used as examples of the electrically conductive material (metal plate 7) that is the configurational base material for the electrode core plate 19, 32, and 47. Basically, however, this may be any of iron, copper, nickel, or aluminum, or any alloy made up primarily of these metals. It is also desirable that the elemental impurities contained in these conductive materials, especially silicon and carbon, each be limited to 0.2 wt % or less. When the content of these elemental impurities, respectively, exceeds 0.2 wt %, this is known to affect the battery cell properties, inviting a decline both in the active material 48 utilization factor and in cycle life.

Furthermore, when the conductive material that is the constituent base material for the electrode core plate 19, 32, and 47, at least in part, has been integrated with another material selected from among metallic materials, inorganic materials, and organic materials, performance improvements are realized in terms of electrolyte-induced corrosion prevention and improved durability, making it possible to improve the characteristics of the electrode core plate 19, 32, and 47. Examples of this include bonding two different simple metal plates together to make a single integrated unit, or subjecting the surface of a processed metal plate 7 to a plating process to form a single integrated unit. For the metallic material that is to be integrated, inorganic materials and organic materials may also be used effectively other than normal metallic materials. Such integration makes it possible to enhance the characteristics of the electrode core plate 19, 32, and 47, to prevent corrosion, and to enhance durability, etc., thus providing enhanced performance and new benefits.

In the embodiments described in the foregoing, the descriptions assume applications to lithium ion secondary cells. The present invention, however, is applicable to alkaline manganese dry cells, lithium primary cells, and other types of primary cell, and also to polymer lithium cells, alkaline storage cells, and other types of secondary cell.

As based on the method of fabricating battery cell electrode core plate according to the present invention, as described in the foregoing, the simple process of implementing an etching treatment is adopted as the second process, wherefore, in the first process, by merely press-molding hollow projections wherein thin-walled portions are inevitably formed in the tips thereof, through holes will be definitely formed by the corrosive removal of the thin-walled portions in the second process. When a thin metal plate is subjected to a perforation process using a punching tool as in the prior art, it is very difficult to punch holes in a high-density arrangement, the maximum opening ratio realizable therewith is no better than 20% or so, and burrs are readily produced. In contrast therewith, with the electrode core plate fabrication method of the present invention, through holes can be formed with a high opening ratio of 60% or so, and arranged in high density. In addition, burrs and other sharply pointed places are removed corrosively by the etching fluid, so that high-quality electrode core plate wherewith there is no danger of internal shorting can be manufactured at extremely low cost, with good mass production yield.

As based on the battery cell electrode core plate according to the present invention, furthermore, contact with the active material is improved by the presence of bulges, as compared to flat surfaces, while active material bonding and electrolyte retention are also improved by the numerous fine irregularities. In addition, the active material particles on both sides of the electrode core plate are directly connected to each other through the through holes, so that active material bonding strength is enhanced, while, at the same time, the electrolyte and gas can freely circulate through the through holes. Accordingly, in electrode plates and battery cells wherein this electrode core plate is used, the current collection properties and active material retention capabilities are both excellent, and, because they are formed by the implementation of an etching treatment, burrs and sharp places cease to exist, and there is no danger of internal shorting.

While preferred embodiments of the invention have been described using specific terms, such description is for illustrative purposes only, and it is to be understood that changes and variations may be made without departing from the spirit or scope of the following claims.

What is claimed is:

1. A method of fabricating a battery cell electrode core plate for retaining an active material and collecting current, comprising the steps of:

providing a thin metal plate exhibiting electrical conductivity;

feeding said metal plate between a primary molding block, having punches which are at least one of conical and pyramidal, and a secondary molding block having concave dies corresponding to said punches;

pressing said metal plate between said primary molding block and said secondary molding block, to form hollow projections with thin-walled tips that project from one side and bulges that bulge out in a direction opposite that of said projections in intervals between said projections; and subjecting said metal plate to a process of at least one of chemical etching and electrolytic etching to corrosively remove said thin-walled tips of said hollow projections, and to thereby form through holes and etch pit irregularities on said metal plate.

2. The battery cell electrode core plate fabrication method according to claim 1, wherein said primary molding block and said secondary molding block are mutually engaged in a roller press configuration, at a constant speed, to continuously form said hollow projections and said bulges in said metal plate.

3. The battery cell electrode core plate fabrication method according to claim 1, further comprising the step of partially flattening said bulges.

4. A method of fabricating a battery cell electrode core plate for retaining an active material and collecting current, comprising the steps of:

providing a thin metal plate exhibiting electrical conductivity;

feeding said metal plate through primary punches, which are at least one of conical and pyramidal, and concave primary dies arranged alternately in a primary molding block, and concave secondary dies corresponding to said primary punches and one of conical and pyramidal secondary punches corresponding to said concave primary dies arranged in a secondary molding block;

pressing said metal plate between said primary molding block and said secondary molding block, to form hollow projections with thin-walled tips that alternately project from both sides and bulges that bulge out in a direction opposite that of said hollow projections in intervals between said projections; and subjecting said metal plate to a process of at least one of chemical etching or electrolytic etching to corrosively remove said thin-walled tips of said projections, and to thereby form through holes and etch pit irregularities on said metal plate.

5. The battery cell electrode core plate fabrication method according to claim 4, wherein said primary molding block and said secondary molding block are mutually engaged in a roller press configuration, at a constant speed, to continuously form said hollow projections and said bulges in said metal plate.

6. The battery cell electrode core plate fabrication method according to claim 4, further comprising the step of partially flattening said bulges.

7. A method of manufacturing a battery cell electrode core plate comprising the steps of:

press molding a metal sheet so as to form hollow projections in said metal sheet; and applying a corrosive material to said metal sheet so as to remove material such that said hollow projections are opened to form projected holes and to remove rough edges and burrs;

wherein said press molding includes pressing the metal sheet between a first molding block and a second molding block and said first molding block has one of conical punches and pyramidal punches for forming said hollow projections in said metal sheet; and wherein said second molding block has concave dies and forms bulges in said metal sheet.

8. The method according to claim 7, further comprising the step of partially flattening said bulges.

9. A method of manufacturing a battery cell electrode core plate comprising the steps of:

press molding a metal sheet so as to form hollow projections in said metal sheet; and applying a corrosive material to said metal sheet so as to remove material such that said hollow projection are opened to form projected holes and to remove rough edges and burrs;

wherein:

said press molding includes pressing the metal sheet between a first molding block and a second molding block;

said first molding block has conical or pyramidal punches and forms hollow projections, in a first direction, in said metal sheet; and said second molding block has concave dies and forms a plurality of bulges, in a second direction, in said metal sheet.

10. A method of manufacturing a battery cell electrode core plate comprising the steps of:

press molding a metal sheet so as to form hollow projections in said metal sheet; and applying a corrosive material to said metal sheet so as to remove material such that said hollow projections are opened to form projected holes and to remove rough edges and burrs;

wherein:

said press molding includes pressing the metal sheet between a first molding block and a second molding block;

said first molding block has conical or pyramidal punches and concave dies and forms hollow projections and bulges, in a first direction, in said metal sheet; and said second molding block has conical or pyramidal punches and concave dies and forms hollow projections and bulges, in a second direction, in said metal sheet.

11. The method according to claim 10, wherein said step of applying a corrosive material is accomplished by a process of chemical etching producing etch pits on said metal sheet.

12. The method according to claim 10, wherein said step of applying a corrosive material is accomplished by a process of electrolytic etching producing etch pits on said metal sheet.

13. A method of manufacturing a battery cell electrode core plate comprising the steps of:

press molding a metal sheet so as to form hollow projections in said metal sheet;

partially flattening said metal sheet after said hollow projections are formed; and applying a corrosive material to said metal sheet so as to remove material such that said hollow projections are opened to form projected holes and to remove rough edges and burrs.

14. The method according to claim 13, wherein $20 \leq X \leq 50$ and $Y \leq +10$ where the thickness of said battery cell electrode core plate is $X \mu m$, and an opening ratio is $Y\%$.

15. The method according to claim 10, wherein $20 \leq X \leq 50$ and $Y \leq +10$ where the thickness of said battery cell electrode core plate is $X \mu m$, and an opening ratio is $Y\%$.

* * * * *